(12) United States Patent
Bonalewicz (10) Patent No.: US 10,889,357 B1
(45) Date of Patent: Jan. 12, 2021

(54) BUOY AND ROPE LAUNCHING DEVICE

(71) Applicant: Walter Bonalewicz, Fall River, MA (US)

(72) Inventor: Walter Bonalewicz, Fall River, MA (US)

( * ) Notice: Subject to any disclaimer, the term of this patent is extended or adjusted under 35 U.S.C. 154(b) by 0 days.

(21) Appl. No.: 16/364,332

(22) Filed: Mar. 26, 2019

(51) Int. Cl.
*B63B 27/16* (2006.01)
*B63B 22/00* (2006.01)
*B63B 27/36* (2006.01)

(52) U.S. Cl.
CPC ............ *B63B 27/16* (2013.01); *B63B 22/003* (2013.01); *B63B 27/36* (2013.01)

(58) Field of Classification Search
CPC .... B60P 1/32; B60P 1/16; B60P 1/165; B60P 1/30; B60P 1/04; B63B 27/36; B63B 35/20; B63B 2027/165; B63C 9/22; A01K 79/00; A01K 93/00; A01K 69/06; A01K 69/08; B66C 13/02
See application file for complete search history.

(56) References Cited

U.S. PATENT DOCUMENTS

| | | | | |
|---|---|---|---|---|
| 659,239 A | * | 10/1900 | Lawson | B60P 1/32 114/33 |
| 1,773,462 A | * | 8/1930 | Lambdin | B63C 9/22 114/190 |
| 2,646,786 A | * | 7/1953 | Robertson | B64D 1/02 124/26 |
| 3,001,825 A | * | 9/1961 | Rouse | B60P 1/14 298/8 R |
| 3,094,359 A | * | 6/1963 | Biszantz | B60P 1/16 298/8 R |
| 3,111,102 A | * | 11/1963 | Gorton, Jr. | B63B 35/14 114/32 |
| 3,181,263 A | | 5/1965 | Rogerson | |
| 3,465,901 A | * | 9/1969 | Grabowski | B63B 35/20 414/137.7 |
| 3,993,011 A | * | 11/1976 | Garland | B63B 27/36 414/137.7 |
| 4,271,553 A | | 6/1981 | Korsvik | |
| 4,272,904 A | | 6/1981 | Francklyn | |
| 4,644,682 A | | 2/1987 | Cloud | |
| 5,165,174 A | * | 11/1992 | Brown, Jr. | A01K 69/06 254/371 |
| 5,339,762 A | | 8/1994 | Waclawik | |
| 5,845,971 A | * | 12/1998 | Rogers | B60P 1/165 298/18 |
| 7,232,353 B1 | | 6/2007 | Gauthier | |
| 2017/0297741 A1 | | 10/2017 | Verho | |

* cited by examiner

Primary Examiner — Gregory W Adams (57) ABSTRACT

The buoy and rope launching device comprises a launch structure, a vessel, and a buoy. The launch structure is configured for use with the vessel. The launch structure is configured for use with a buoy. The buoy further comprises a pennant. The pennant is a rope that attaches the buoy to the pot. The launch structure jettisons the buoy and the pennant from the vessel. The use of the launch structure prevents the entanglement of a crewperson in the pennant as the buoy and pennant are jettisoned.

19 Claims, 6 Drawing Sheets

BUOY AND ROPE LAUNCHING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including equipment configured for use with water vessels, more specifically, a ship-based device for unloading floating cargo. (B63B27/36)

SUMMARY OF INVENTION

The buoy and rope launching device comprises a launch structure, a vessel, and a buoy. The launch structure is configured for use with the vessel. The launch structure is configured for use with a buoy. The buoy further comprises a pennant. The pennant is a rope that attaches the buoy to the crab or fish pot. The launch structure jettisons the buoy and the pennant from the vessel. The use of the launch structure prevents the entanglement of a crewperson in the pennant as the buoy and pennant are jettisoned.

These together with additional objects, features and advantages of the buoy and rope launching device will be readily apparent to those of ordinary skill in the art upon reading the following detailed description of the presently preferred, but nonetheless illustrative, embodiments when taken in conjunction with the accompanying drawings.

In this respect, before explaining the current embodiments of the buoy and rope launching device in detail, it is to be understood that the buoy and rope launching device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the buoy and rope launching device.

It is therefore important that the claims be regarded as including such equivalent construction insofar as they do not depart from the spirit and scope of the buoy and rope launching device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
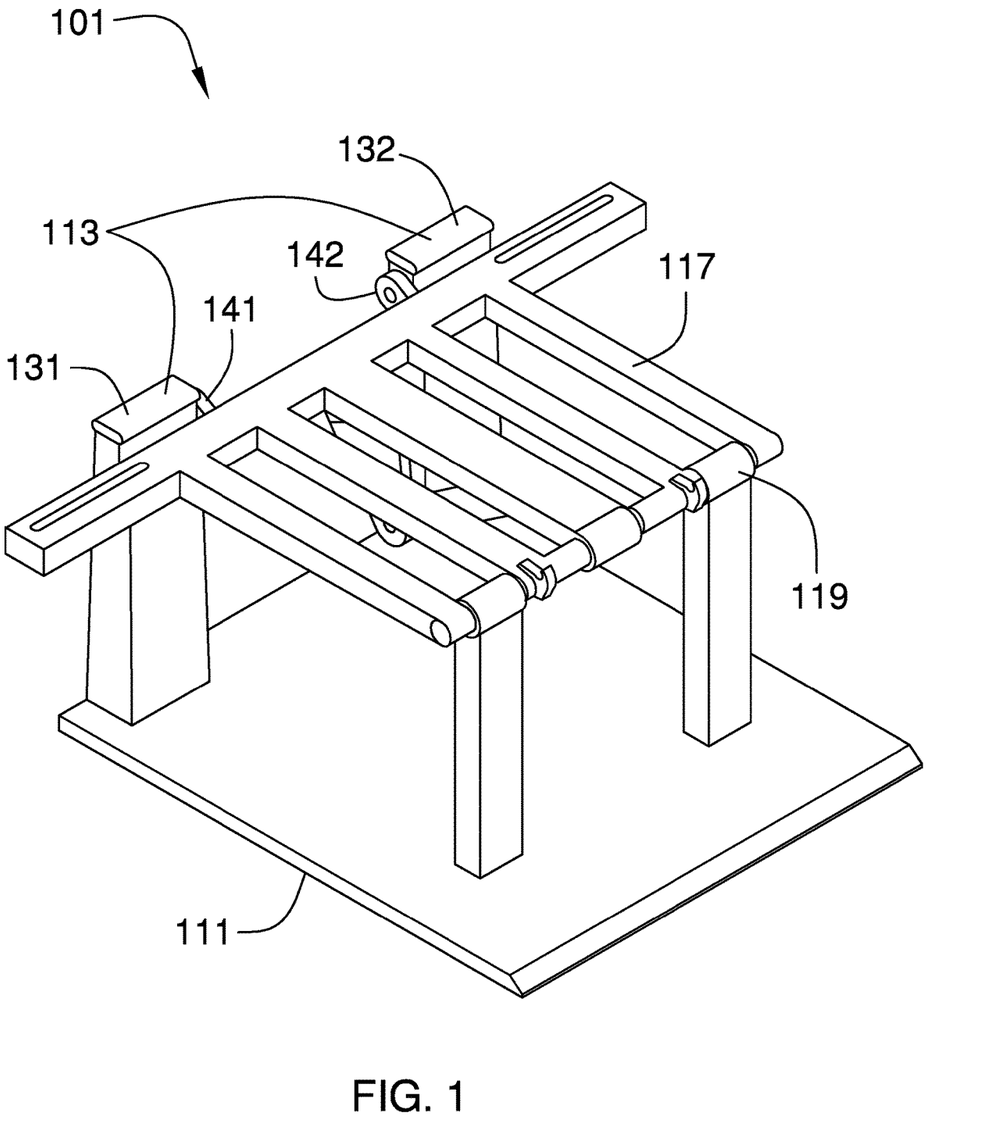
FIG. 1 is a perspective view of an embodiment of the disclosure.
Figure 2:
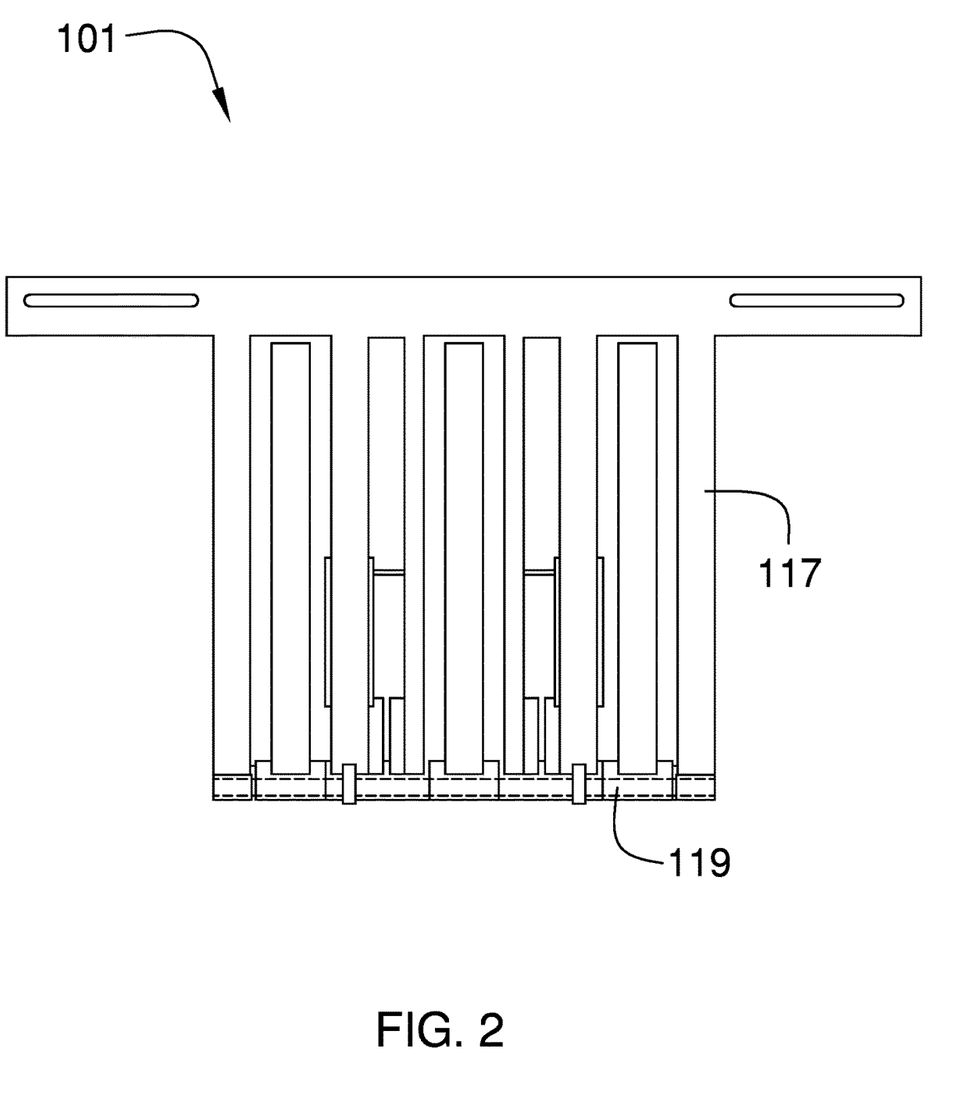
FIG. 2 is a top view of an embodiment of the disclosure.
Figure 3:
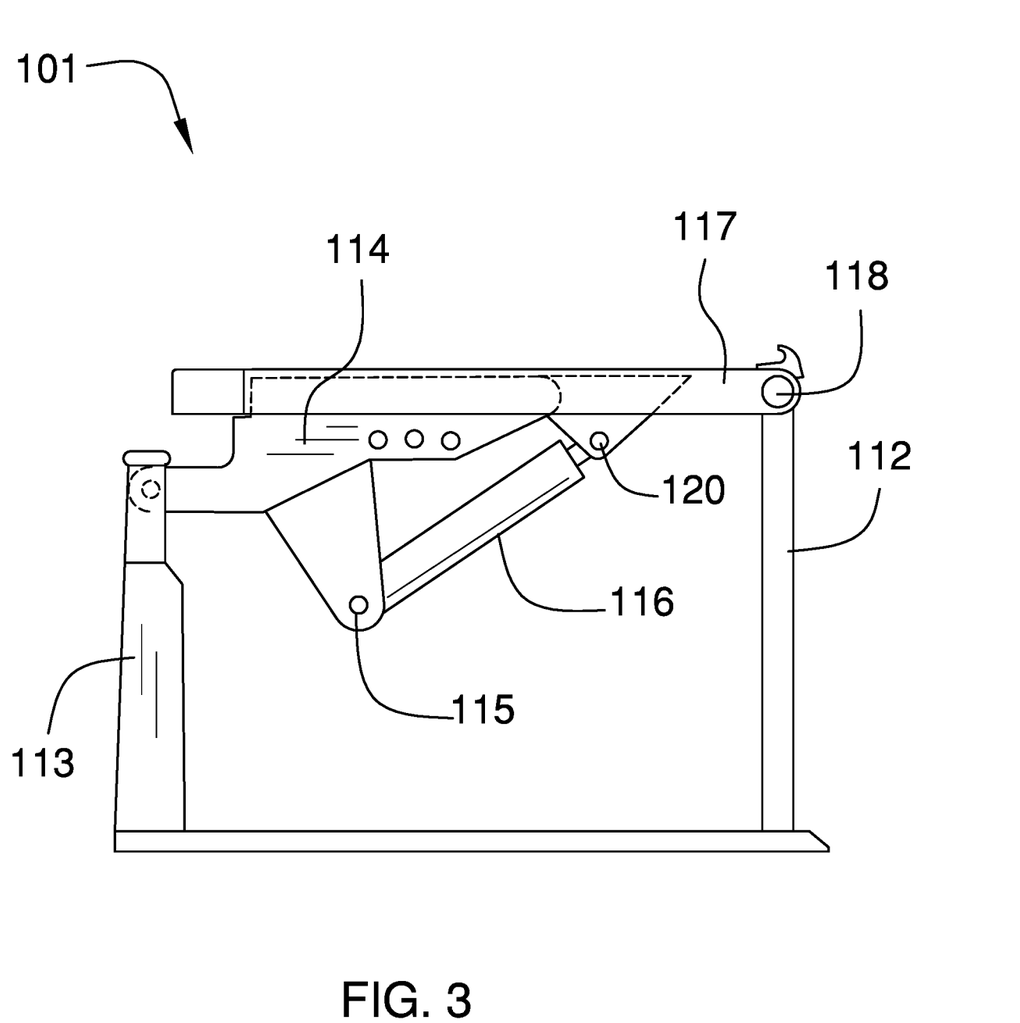
FIG. 3 is a side view of an embodiment of the disclosure.
Figure 4:
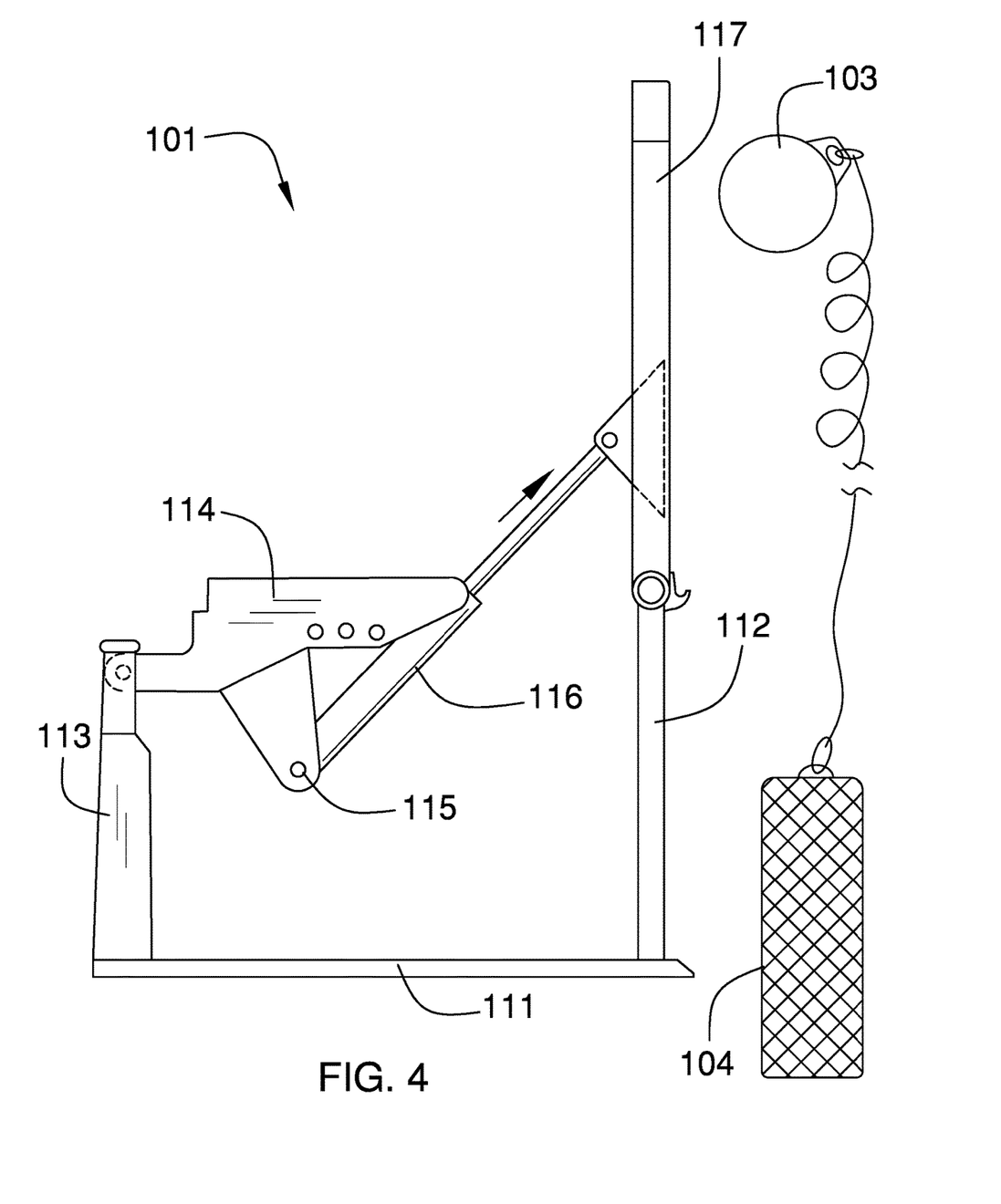
FIG. 4 is a post-deployment side view of an embodiment of the disclosure.
Figure 5:
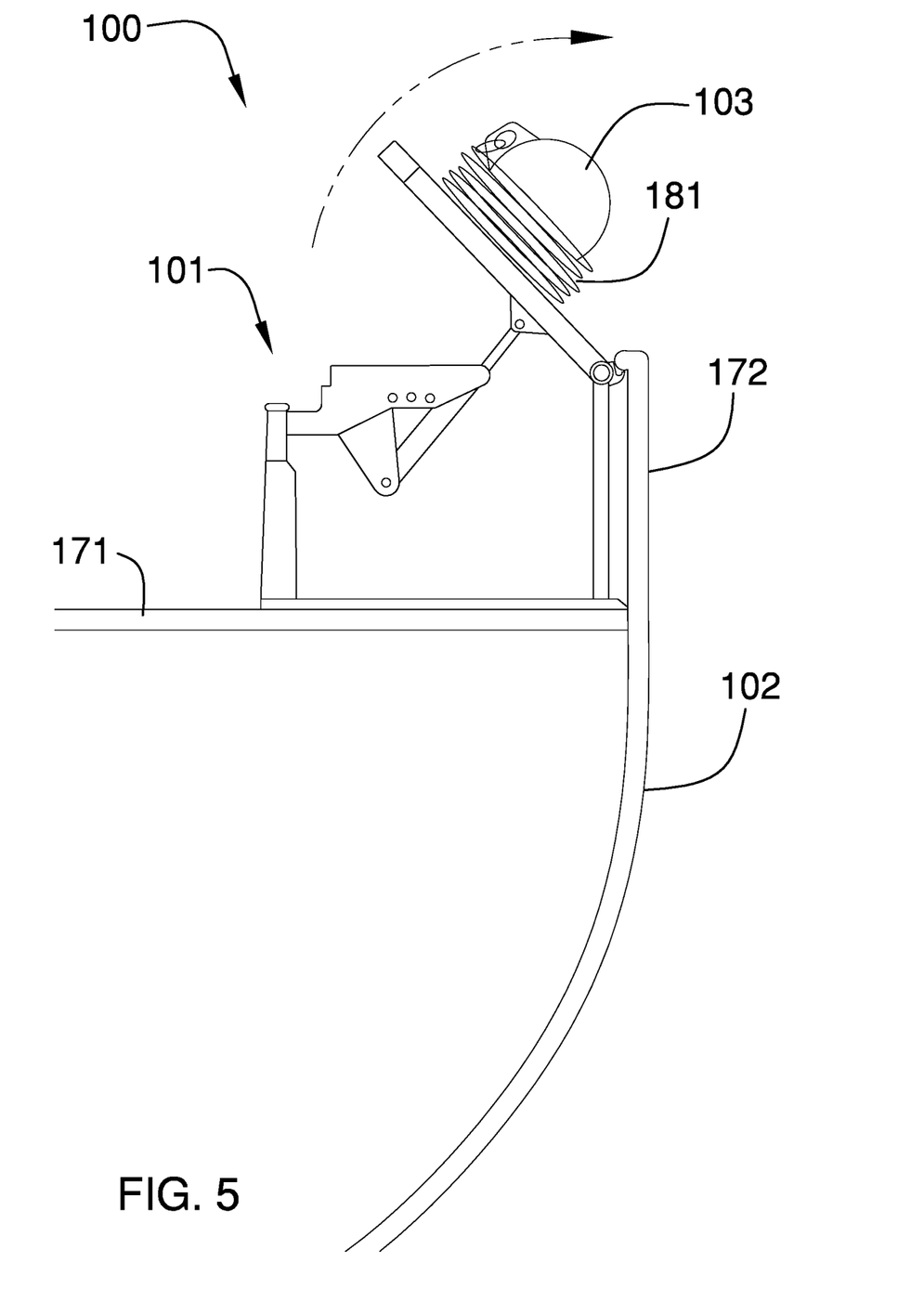
FIG. 5 is an in-use view of an embodiment of the disclosure.
Figure 6:
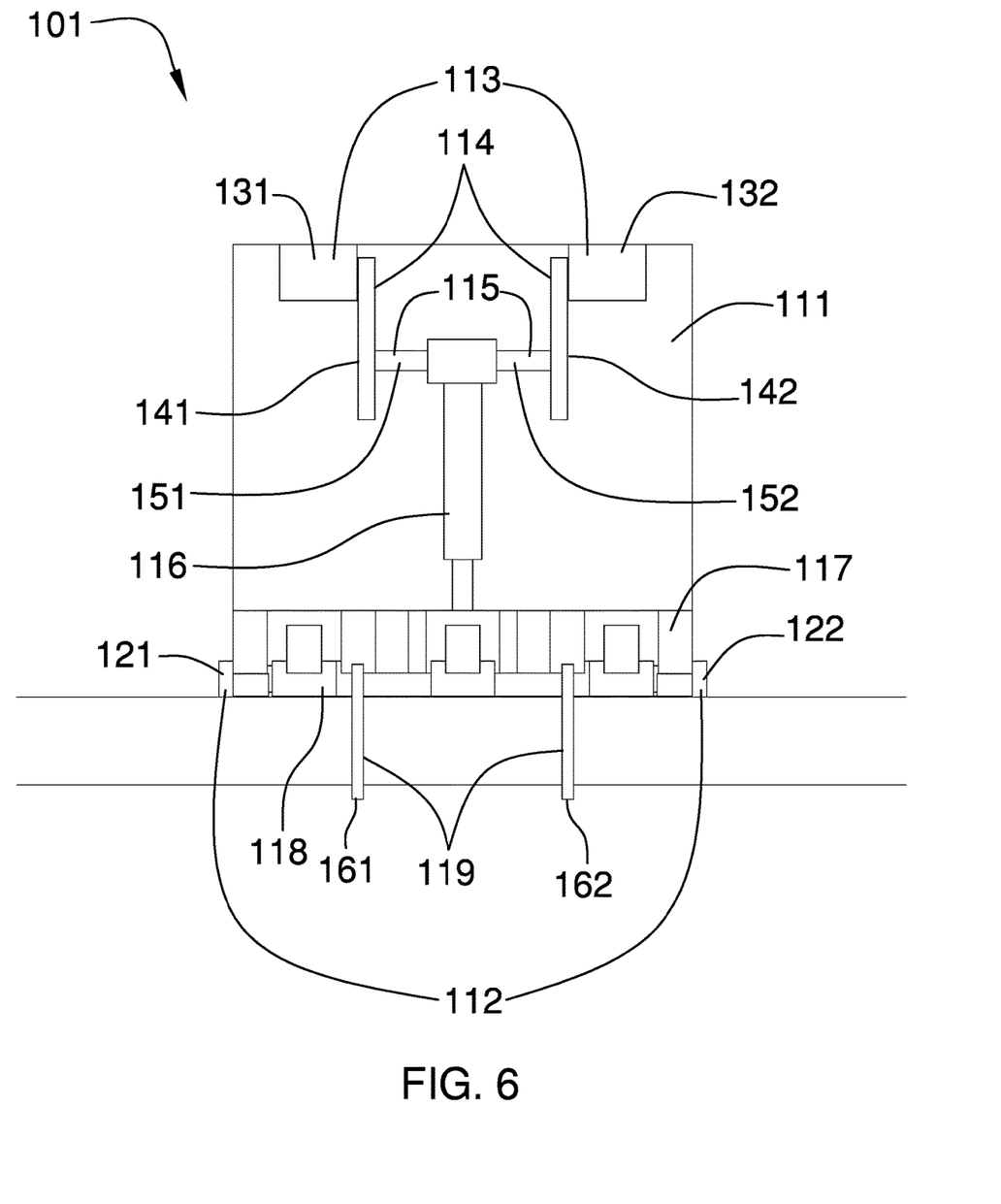
FIG. 6 is a post-deployment top view of an embodiment of the disclosure.

Detailed reference will now be made to one or more potential embodiments of the disclosure, which are illustrated in FIGS. 1 through 6.

The buoy and rope launching device 100 (hereinafter invention) comprises a launch structure 101, a vessel 102, a buoy 103, and a pot 104. The launch structure 101 is configured for use with the vessel 102. The launch structure 101 is configured for use with a buoy 103. The buoy 103 further comprises a pennant 181. The pennant 181 is a rope that attaches the buoy 103 to the vessel 102. The launch structure 101 jettisons the buoy 103 and the pennant 181 from the vessel 102. The use of the launch structure 101 prevents the entanglement of a crewperson in the pennant 181 as the buoy 103 and pennant 181 are jettisoned.

The vessel 102 is a floating structure used to transport goods over the water. The vessel 102 is further defined elsewhere in this disclosure. The vessel 102 further comprises a deck 171 and a transom 172. The deck 171 is defined elsewhere in this disclosure. The transom 172 is defined elsewhere in this disclosure.

The buoy 103 is a floating structure used to mark a location in a body of water. The buoy 103 further comprises a pennant 181. The pennant 181 is defined elsewhere in this disclosure.

The launch structure 101 is a mechanical device. The launch structure 101 is a hydraulically powered device. The launch structure 101 forms a platform on which the buoy 103 and the pennant 181 rest. The launch structure 101 jettisons the buoy 103 and the pennant 181 simultaneously from the vessel 102. By simultaneously jettisoning the buoy 103 and the pennant 181 from the vessel 102, the launch structure 101 reduces the chances that a crewperson will get tangled in the pennant 181 during the process. The launch structure 101 is a portable structure. The portable nature of the launch structure 101 allows the launch structure 101 to be stowed when the launch structure 101 is not required for the operation of the vessel 102.

The launch structure 101 comprises a pedestal 111, a plurality of transom 172 bollards 112, a plurality of medial bollards 113, a plurality of joists 114, a plurality of jibs 115, a hydraulic piston 116, a foraminous launch plate 117, a launch plate hinge 118, and a plurality of transom 172 hooks 119.

The pedestal 111 is a disk-shaped plate. The faces of the disk-shape of the pedestal 111 form the superior and inferior surfaces of the pedestal 111. The pedestal 111 forms the final link of the load path that transfers the load of the balance of the launch structure 101 to the deck 171 of the vessel 102. The pedestal 111 can be carried or slid to a position proximal to the transom 172 of the vessel 102. The inferior face of the pedestal 111 rests on the deck 171 of the vessel 102.

Each of the plurality of transom 172 bollards 112 is a stanchion. Each of the plurality of transom 172 bollards 112 has a prism shape. Each of the plurality of transom 172 bollards 112 are identical. Each of the plurality of transom 172 bollards 112 project vertically away from the pedestal 111 in the manner of a cantilever. Each of the plurality of transom 172 bollards 112 is an extension structure. The launch plate hinge 118 attaches to the plurality of transom 172 bollards 112 such that the reach between the launch plate hinge 118 and the pedestal 111 is raised to a position roughly level with the superior edge of the transom 172.

The plurality of transom 172 bollards 112 comprises a first transom 172 bollard 121 and a second transom 172 bollard 122. The first transom 172 bollard 121 is a prism-shaped shaft. The launch plate hinge 118 is secured to the first transom 172 bollard 121. The second transom 172 bollard 122 is a prism-shaped shaft. The launch plate hinge 118 is secured to the second transom 172 bollard 122.

Each of the plurality of medial bollards 113 is a stanchion. Each of the plurality of medial bollards 113 has a prism shape. Each of the plurality of medial bollards 113 are identical. Each of the plurality of medial bollards 113 project vertically away from the pedestal 111 in the manner of a cantilever. Each of the plurality of medial bollards 113 is an extension structure. The plurality of joists 114 attaches to the plurality of medial bollards 113 such that the reach between the plurality of joists 114 and the pedestal 111 is raised to a position roughly level with the superior edge of the transom 172. During the use of the launch structure 101, the pedestal 111 is positioned on the deck 171 of the vessel 102 such that the plurality of medial bollards 113 are distal from the transom 172 of the vessel 102 relative to the plurality of transom 172 bollards 112.

The plurality of medial bollards 113 comprises a first medial bollard 131 and a second medial bollard 132. The first medial bollard 131 is a prism-shaped shaft. The first joist 141 is secured to the first medial bollard 131. The second medial bollard 132 is a prism-shaped shaft. The second joist 142 is secured to the second medial bollard 132.

Each of the plurality of joists 114 is a disk-shaped plate structure. Each of the plurality of joists 114 rigidly attaches to a medial bollard selected from the plurality of medial bollards 113 such that the faces of the disk structure of the each selected joist: a) are parallel to the center axis of each of the plurality of medial bollards 113; and, b) are perpendicular to the plane formed by the center axes of two transom 172 bollards selected from the plurality of transom 172 bollards 112. By rigidly attached is meant each combination of joist and medial bollard forms a rigid structure.

The plurality of joists 114 forms a structure that supports the foraminous launch plate 117 in a position parallel to the pedestal 111. The foraminous launch plate 117 rotates into a position where the foraminous launch plate 117 rests on the plurality of joists 114.

The plurality of joists 114 comprises a first joist 141 and a second joist 142. The first joist 141 is a disk-shaped plate. The first jib 151 attached the hydraulic piston 116 to the first joist 141. The second joist 142 is a disk-shaped plate. The second jib 152 attaches the hydraulic piston 116 to the second joist 142.

Each of the plurality of jibs 115 is a prism-shaped shaft. There is a one to one correspondence between the plurality of jibs 115 and the plurality of joists 114. Each jib selected from the plurality of jibs 115 rigidly attaches the hydraulic piston 116 to the joist selected from the plurality of joists 114 that is associated with the selected jib. By rigidly attached is meant each combination of jib, joist and hydraulic piston 116 forms a rigid structure. Each jib selected from the plurality of jibs 115 attaches to its associated joist in the manner of a cantilever.

The rigid structures formed by each of the plurality of jibs 115 suspends the hydraulic piston 116 above the pedestal 111. The rigid structures formed by each of the plurality of jibs 115, the plurality of jibs 115 and the plurality of joists 114 hold the hydraulic piston 116 is a fixed position relative to the pedestal 111, the plurality of transom 172 bollards 112, and the plurality of medial bollards 113. The plurality of jibs 115 comprises a first jib 151 and a second jib 152. The first jib 151 is a prism-shaped shaft. The second jib 152 is a prism-shaped shaft.

The hydraulic piston 116 is a hydraulically powered device. The hydraulic piston 116 is a piston that moves within a cylinder. Hydraulic forces move the piston within the cylinder. The piston structure of the hydraulic piston 116 attaches to the foraminous launch plate 117 such that the movement of the piston within the cylinder rotates the foraminous launch plate 117 around the launch plate hinge 118. The hydraulic piston 116 attaches to the foraminous launch plate 117 using a universal joint 120. The universal joint 120 is defined elsewhere in this disclosure.

The hydraulic piston 116 transfers the motive forces necessary to jettison the buoy 103 and the pennant 181 from the vessel 102 directly to the foraminous launch plate 117. The use of hydraulic technology to accomplish the tasks described in this paragraph are well-known and documented in the mechanical arts.

The foraminous launch plate 117 is a disk-shaped plate. The launch plate hinge 118 attaches the foraminous launch plate 117 to the plurality of transom 172 bollards 112 such that the foraminous launch plate 117 will rotate from a position parallel to the pedestal 111 to a position perpendicular to the pedestal 111. The launch plate hinge 118 is a commercially available hinge. The foraminous launch plate 117 is formed with a plurality of apertures formed between the faces of the disk structure of the foraminous launch plate 117. The foraminous structure of the foraminous launch plate 117 allows for the drainage of water from the superior surface of the foraminous launch plate 117 when the foraminous launch plate 117 is positioned parallel to the pedestal 111. The buoy 103 and the pennant 181 are placed on the foraminous launch plate 117 when the foraminous launch plate 117 is positioned parallel to the pedestal 111.

Each of the plurality of transom 172 hooks 119 is a curved hook structure that attaches a transom 172 bollard selected from the plurality of transom 172 bollards 112 to the transom 172 of the vessel 102. The plurality of transom 172 hooks 119 prevent the launch structure 101 from shifting during use. The launch plate hinge 118 comprises a first transom 172 hook 161 and a second transom 172 hook 162. The first transom 172 hook 161 is a first curved hook structure that attaches first transom 172 bollard 121 to the transom 172 of the vessel 102. The second transom 172 hook 162 is a second curved hook structure that attaches second transom 172 bollard 122 to the transom 172 of the vessel 102.

The pedestal 111, the plurality of transom 172 bollards 112, the plurality of medial bollards 113, the plurality of joists 114, the plurality of jibs 115, the foraminous launch plate 117 and the plurality of transom hooks 119 are formed from a material selected from the group consisting of stainless steel, aluminum, or polyvinyl chloride. The applicant prefers the use of stainless steel. The launch plate hinge 118, the hydraulic piston 116, and the universal joint 120 are commercially available structures.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Beam: As used in this disclosure, a beam is a horizontally oriented shaft that: 1) is suspended above a supporting surface; and, 2) bears a load.

Bollard: As used in this disclosure, a bollard is a heavy vertical stanchion used as an anchor point to anchor an object to a horizontal surface. Bollards are often called Samson posts.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Deck: As used in this disclosure, a deck is an elevated horizontal surface that is intended to support a load.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Extension Structure: As used in this disclosure, an extension structure is an inert physical structure that is used to extend or bridge the reach between any two objects.

Fluid: As used in this disclosure, a fluid refers to a state of matter wherein the matter is capable of flow and takes the shape of a container it is placed within. The term fluid commonly refers to a liquid or a gas.

Foraminous: As used in this disclosure, foraminous is an adjective that describes a surface, plate, or platform that is perforated with a plurality of holes.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hinge: As used in this disclosure, a hinge is a device that permits the turning, rotating, or pivoting of a first object relative to a second object.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hydraulic: As used in this disclosure, hydraulic refers to a device wherein the movement of the device is powered using a fluid under pressure.

Inferior: As used in this disclosure, the term inferior refers to a directional reference that is parallel to and in the same direction as the force of gravity when an object is positioned or used normally.

Jettison: As used in this disclosure, to jettison means to throw an object out of a vessel. Objects that have been jettisoned from a vessel are referred to as jetsam.

Jib: As used in this disclosure, a jib is a beam structure that: 1) is mounted with a free end in the manner of a cantilever; and, 2) suspends a load at the free end of the jib. In multicomponent beam structures, such as with a crane, the jib is the sub-structure that physically suspends the load.

Joists: As used in this disclosure, the term joists refers to a plurality of parallel horizontal beams that are used to support a horizontal surface. A single beam selected from the plurality of parallel horizontal beams is referred to in the singular as a joist.

Liquid: As used in this disclosure, a liquid refers to a state (phase) of matter that is fluid and that maintains, for a given pressure, a fixed volume that is independent of the volume of the container.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pedestal: As used in this disclosure, a pedestal is an intermediary load-bearing structure that that transfers a load between a between two objects or structures.

Pennant: As used in this disclosure, a pennant is a cord that is used to attach a buoy to a pot.

Phase: As used in this disclosure, phase refers to the state of the form of matter. The common states of matter are solid, liquid, gas, and plasma.

Piston: As used in this disclosure, a piston is a disk that closely fits within a pipe or tube and that moves along the center axis of the pipe or tube. Depending on the context, a piston can also refer to the apparatus associated with the disk that allows the disk to move within the pipe or tube.

Pivot: As used in this disclosure, a pivot is a rod or shaft around which an object rotates or swings.

Plate: As used in this disclosure, a plate is a smooth, flat and semi-rigid or rigid structure that has at least one dimension that: a) is of uniform thickness; and b) that appears thin relative to the other dimensions of the object. Plates are often disks. The face of the plate is a surface of the plate selected from the group consisting of: a) the surface of the plate with the greatest surface area; b) the surface of the plate that is distal from the surface of the plate with the greatest surface area. The edges of the plate comprise the surfaces of the plate that would not be considered faces as defined above. As defined in this disclosure, plates may be made of any material, but are commonly made of metal, plastic, and wood. When made of wood, a plate is often referred to as a board.

Pot: As used in this disclosure, the term pot is being used to refer to a trap or pot for trapping crab, fish, and other sea life.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force.

Roughly: As used in this disclosure, roughly refers to a comparison between two objects. Roughly means that the difference between one or more parameters of the two compared are not significantly different.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Transom: As used in this disclosure, a transom refers to a vertical exterior surface of a vessel that is above the waterline. The term transom is often used more specifically to refer to the stern of the vessel.

Universal Joint: As used in this disclosure, a universal joint is a method of joining a first shaft to a second shaft such that the center axis of the first shaft and is offset from the center axis of the second shaft. The offset angle is adjustable. When a universal joint is formed with a locking mechanism, a universal joint can further be used to lock the offset angle between the first shaft and the second shaft into a fixed position. Universal joints are often used to transfer rotation from the first shaft to rotate the second shaft.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vessel: As used in this disclosure, a vessel is a type of vehicle. A vessel transports passengers, goods, or equipment over water.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A ship-based device for unloading floating cargo comprising
   a launch structure, a vessel, and a buoy;
   wherein the launch structure is configured for use with the vessel;
   wherein the launch structure is configured for use with the buoy;
   wherein the buoy further comprises a pennant;
   wherein the pennant attaches the buoy to the pot;
   wherein the launch structure jettisons the buoy and the pennant from the vessel;
   wherein the vessel further comprises a deck and a transom;
   wherein the buoy is a floating structure;
   wherein the launch structure comprises a pedestal, a plurality of transom bollards, a plurality of medial bollards, a plurality of joists, a plurality of jibs, a hydraulic piston, a foraminous launch plate, a launch plate hinge, and a plurality of transom hooks;
   wherein the plurality of transom bollards and the plurality of medial bollards attach to the pedestal;
   wherein the plurality joists attach to the plurality of medial bollards;
   wherein the plurality of jibs attach the hydraulic piston to the plurality of joists;
   wherein the launch plate hinge attaches the foraminous launch plate to the plurality of transom bollards such that the foraminous launch plate rotates;
   wherein the plurality of transom hooks attach to the plurality of transom bollards.

2. The ship-based device for unloading floating cargo according to claim 1
   wherein the launch structure is a mechanical device;
   wherein the launch structure is a hydraulically powered device;
   wherein the launch structure forms a platform on which the buoy and the pennant rest;
   wherein the launch structure jettisons the buoy and the pennant simultaneously from the vessel, and immediately after the pot is launched from said vessel.

3. The ship-based device for unloading floating cargo according to claim 2 wherein the launch structure is a portable structure.

4. The ship-based device for unloading floating cargo according to claim 3
   wherein the pedestal is a disk-shaped plate;
   wherein the faces of the disk-shape of the pedestal form the superior and inferior surfaces of the pedestal;
   wherein the inferior face of the pedestal rests on the deck of the vessel.

5. The ship-based device for unloading floating cargo according to claim 4
   wherein each of the plurality of transom bollards is a stanchion;
   wherein each of the plurality of transom bollards has a prism shape;
   wherein each of the plurality of transom bollards are identical;
   wherein each of the plurality of transom bollards project vertically away from the pedestal in the manner of a cantilever.

6. The ship-based device for unloading floating cargo according to claim 5
   wherein each of the plurality of transom bollards is an extension structure;
   wherein the launch plate hinge attaches to the plurality of transom bollards such that the reach between the launch plate hinge and the pedestal is roughly level with the superior edge of the transom.

7. The ship-based device for unloading floating cargo according to claim 6
   wherein each of the plurality of medial bollards is a stanchion;
   wherein each of the plurality of medial bollards has a prism shape;
   wherein each of the plurality of medial bollards is identical;
   wherein each of the plurality of medial bollards projects vertically away from the pedestal in the manner of a cantilever.

8. The ship-based device for unloading floating cargo according to claim 7
   wherein each of the plurality of medial bollards is an extension structure;
   wherein the plurality of joists attaches to the plurality of medial bollards such that the reach between the plurality of joists and the pedestal is roughly level with the superior edge of the transom;
   wherein during the use of the launch structure, the pedestal is positioned on the deck of the vessel such that the plurality of medial bollards are distal from the transom of the vessel relative to the plurality of transom bollards.

9. The ship-based device for unloading floating cargo according to claim 8
   wherein each of the plurality of joists is a disk-shaped plate structure;
   wherein each of the plurality of joists rigidly attaches to a medial bollard selected from the plurality of medial bollards such that the faces of the disk structure of the each selected joist are parallel to the center axis of each of the plurality of medial bollards
   wherein each of the plurality of joists rigidly attaches to a medial bollard selected from the plurality of medial bollards such that the faces of the disk structure of the each selected joist are perpendicular to the plane formed by the center axes of two transom bollards selected from the plurality of transom bollards;
   wherein by rigidly attached is meant each combination of joist and medial bollard forms a rigid structure.

10. The ship-based device for unloading floating cargo according to claim 9
    wherein the plurality of joists forms a structure that supports the foraminous launch plate in a position parallel to the pedestal;

wherein the foraminous launch plate rotates into a position where the foraminous launch plate rests on the plurality of joists.

11. The ship-based device for unloading floating cargo according to claim 10
wherein each of the plurality of jibs is a prism-shaped shaft;
wherein there is a one to one correspondence between the plurality of jibs and the plurality of joists;
wherein each jib selected from the plurality of jibs rigidly attaches the hydraulic piston to the joist selected from the plurality of joists that is associated with the selected jib;
wherein by rigidly attached is meant each combination of jib, joist and the hydraulic piston forms a rigid structure;
wherein each jib selected from the plurality of jibs attaches to its associated joist in the manner of a cantilever.

12. The ship-based device for unloading floating cargo according to claim 11
wherein the rigid structures formed by each of the plurality of jibs suspends the hydraulic piston above the pedestal;
wherein the rigid structures formed by each of the plurality of jibs, the plurality of jibs and the plurality of joists hold the hydraulic piston is a fixed position relative to the pedestal, the plurality of transom bollards, and the plurality of medial bollards.

13. The ship-based device for unloading floating cargo according to claim 12
wherein the hydraulic piston is a hydraulically powered device;
wherein the hydraulic piston is a piston that moves within a cylinder;
wherein hydraulic forces move the piston within the cylinder.

14. The ship-based device for unloading floating cargo according to claim 13
wherein the piston structure of the hydraulic piston attaches to the foraminous launch plate such that the movement of the piston within the cylinder rotates the foraminous launch plate around the launch plate hinge;
wherein the hydraulic piston attaches to the foraminous launch plate using a universal joint.

15. The ship-based device for unloading floating cargo according to claim 14
wherein the foraminous launch plate is a disk-shaped plate;
wherein the launch plate hinge is a hinge;
wherein the launch plate hinge attaches the foraminous launch plate to the plurality of transom bollards such that the foraminous launch plate will rotate from a position parallel to the pedestal to a position perpendicular to the pedestal.

16. The ship-based device for unloading floating cargo according to claim 15
wherein each of the plurality of transom hooks is a curved hook structure that attaches a transom bollard selected from the plurality of transom bollards to the transom of the vessel.

17. The ship-based device for unloading floating cargo according to claim 16
wherein the foraminous launch plate is formed with a plurality of apertures formed between the faces of the disk structure of the foraminous launch plate;
wherein the buoy and the pennant are placed on the foraminous launch plate when the foraminous launch plate is positioned parallel to the pedestal.

18. The ship-based device for unloading floating cargo according to claim 17
wherein the plurality of joists comprises a first joist and a second joist;
wherein the plurality of jibs comprises a first jib and a second jib;
wherein the first jib is a prism-shaped shaft;
wherein the second jib is a prism-shaped shaft;
wherein the first joist is a disk-shaped plate;
wherein the first jib attaches the hydraulic piston to the first joist;
wherein the second joist is a disk-shaped plate;
wherein the second jib attaches the hydraulic piston to the second joist.

19. The ship-based device for unloading floating cargo according to claim 18
wherein the plurality of transom bollards comprises a first transom bollard and a second transom bollard;
wherein the first transom bollard is a prism-shaped shaft;
wherein the launch plate hinge is secured to the first transom bollard;
wherein the second transom bollard is a prism-shaped shaft;
wherein the launch plate hinge is secured to the second transom bollard;
wherein the plurality of medial bollards comprises a first medial bollard and a second medial bollard;
wherein the first medial bollard is a prism-shaped shaft;
wherein the first joist is secured to the first medial bollard;
wherein the second medial bollard is a prism-shaped shaft;
wherein the second joist is secured to the second medial bollard;
wherein the launch plate hinge comprises a first transom hook and a second transom hook;
wherein the first transom hook is a first curved hook structure that attaches first transom bollard to the transom of the vessel;
wherein the second transom hook is a second curved hook structure that attaches second transom bollard to the transom of the vessel.

* * * * *